United States Patent [19]
Viola

[11] Patent Number: 5,913,943
[45] Date of Patent: Jun. 22, 1999

[54] AERODYNAMIC BICYCLE BRAKE LEVER

[76] Inventor: Barry J. Viola, Rte. 4, Box 60A, Arkansas City, Kans. 67005

[21] Appl. No.: 08/713,104

[22] Filed: Sep. 16, 1996

[51] Int. Cl.⁶ .................................................. G05G 11/00

[52] U.S. Cl. ............................. 74/489; 74/488; 74/502.2

[58] Field of Search .......................... 74/488, 489, 502.2, 74/551.9, 551.1

[56] References Cited

U.S. PATENT DOCUMENTS

| | | | |
|---|---|---|---|
| 2,387,020 | 10/1945 | Helme | 74/489 |
| 4,674,353 | 6/1987 | Yoshigai | 74/489 |
| 4,941,232 | 7/1990 | Decker et al. | 74/551.9 X |
| 5,201,243 | 4/1993 | Schneider | 74/551.1 |
| 5,584,210 | 12/1996 | Gelbein | 74/489 |

FOREIGN PATENT DOCUMENTS

| | | | |
|---|---|---|---|
| 620136 | 5/1961 | Canada | 74/489 |
| 1109346 | 9/1955 | France | 74/489 |
| 442982 | 12/1948 | Italy | 74/489 |
| 348062 | 7/1960 | Switzerland | 74/489 |

OTHER PUBLICATIONS

*Excel Sports Boulder*, dated Jun. 5, 1996, pp. 17–18.
*Colorado Cyclist*, dated Fall 1996, pp. 30–46.

Primary Examiner—John A. Jeffery
Assistant Examiner—David Fenstermacher
Attorney, Agent, or Firm—Shook, Hardy & Bacon L.L.P.

[57] ABSTRACT

A brake lever assembly device is provided that can be mounted on the handlebars of a bicycle. The brake lever has a rear brake body that is coupled to at least one end of the handlebars and a front brake body that is pivotally connected to the rear brake body. The front brake body is moveable between an idle position in which the brake is not applied, and an engaged position in which the brake is fully applied. The front brake body is biased towards the idle position, so that the brake is not applied when no downward force is applied to the front brake body. Further, the front brake body is mechanically coupled to the bicycle brake so that pivoting the front brake body into the engaged position causes the brake to be fully applied. Still further, the front brake body and the rear brake body are coupled in-line with at least one end of the handlebars so that the rear brake body and the front brake body extend outwardly along a central axis of the end of the handlebars.

11 Claims, 2 Drawing Sheets

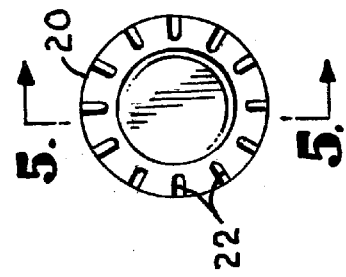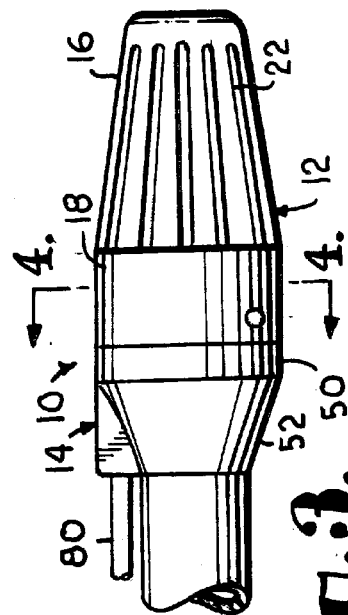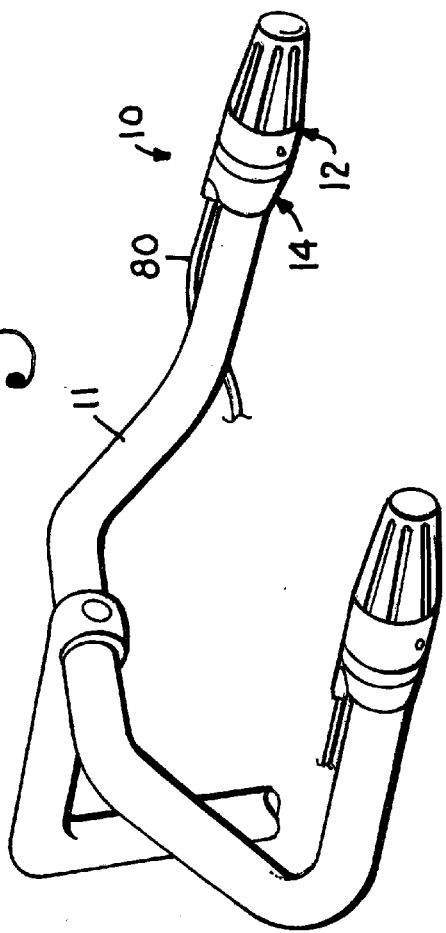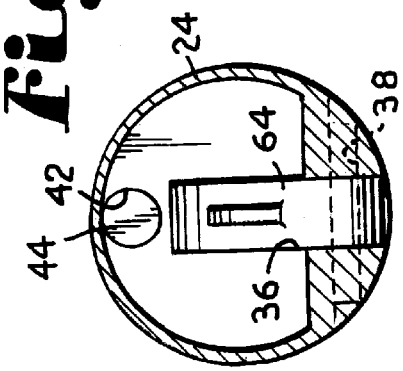

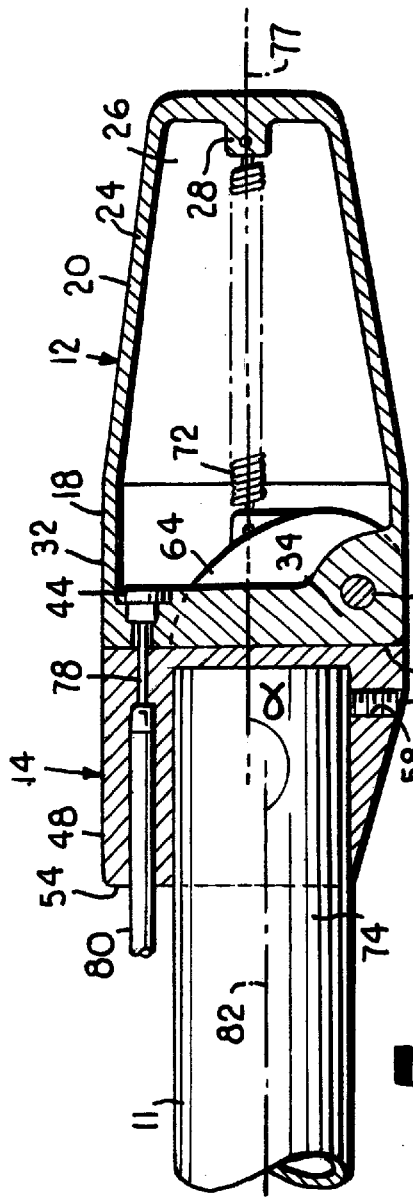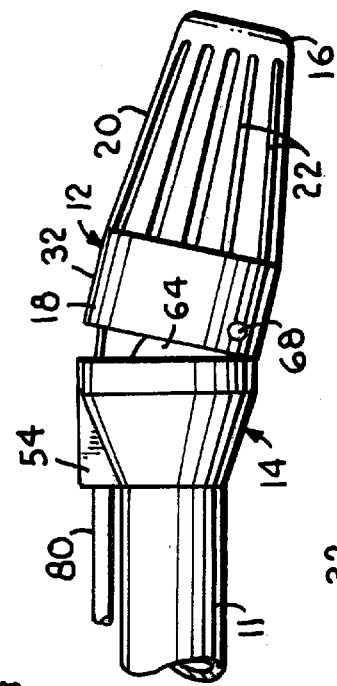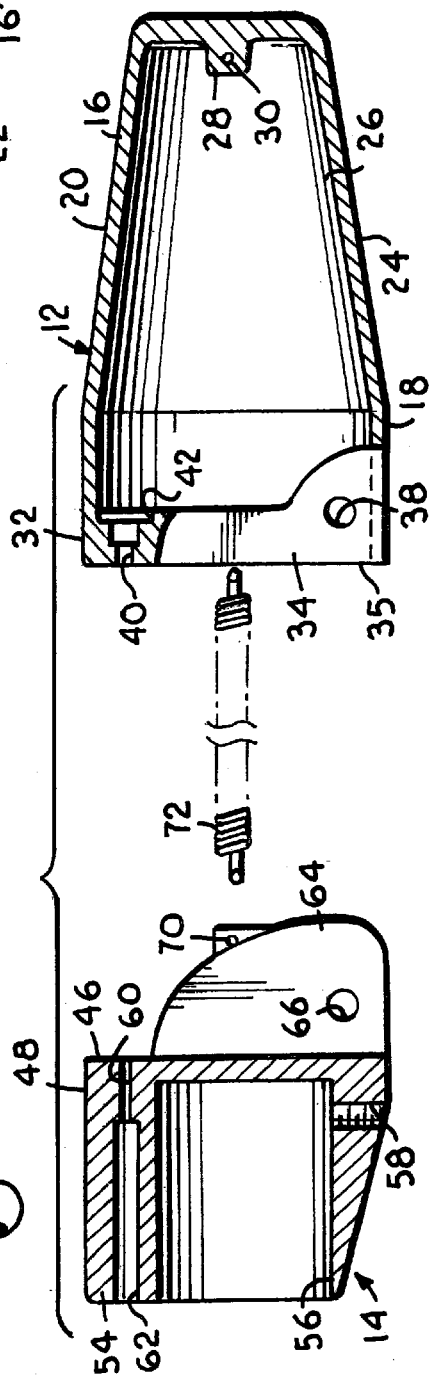

AERODYNAMIC BICYCLE BRAKE LEVER

FIELD OF THE INVENTION

This invention relates to brake levers used on bicycles, and more particularly to aerodynamic brake levers used on bicycles for competitive racing.

BACKGROUND OF THE INVENTION

Bicycle racing is becoming an increasingly popular and competitive sport. In certain bicycle races, called time trials, a bicycle racer competes against other riders in an attempt to establish the lowest time needed to ride a given distance. In time trials, there is typically only one rider on a given section of the course at a time. Thus, the rider will not have the opportunity to reduce the amount of air resistance by "drafting" or riding directly behind another rider. Therefore, during these time trials, the aerodynamics of both the bicycle and the rider are very important. Many steps have heretofore been taken to reduce the drag or air resistance encountered by the bicycle rider.

Specialized bikes that incorporate a number of aerodynamic advantages are now used by riders in these time trial races. Power is consumed by three basic sources for these types of bicycles. The first source of power consumption is the aerodynamic drag caused by the bike and the rider. The second is the rolling resistance of the tires. The third source of power consumption is the aerodynamic drag caused by the spinning bicycle wheels. Therefore, one method of reducing power consumption, and therefore decreasing the time necessary to ride a given distance, is to reduce the aerodynamic drag caused by the bike and the rider.

The leading edge of a bicycle, which includes the handlebars of the bicycle, will encounter relatively calm air and will not be influenced by interaction with the bicycle rider's body. The bicycle handlebars are therefore responsible for a portion of the aerodynamic drag encountered by the bicycle rider. Therefore, by improving the overall aerodynamics of the handlebars, the aerodynamic drag encountered by the rider will also be improved.

A typical time trial bike will be equipped with "hook" handlebars that are sometimes called "cow horns". This type of handle bar is substantially u-shaped with the sides of the "u" pointing forwardly. The forward-most end of each side of this "u" is turned upwardly and is typically equipped with a standard brake lever. In operation, the rider will grasp the cow horns near the ends equipped with the standard brake levers. When the rider desires to slow or stop the bike, the rider will reach outwardly to grasp and then squeeze the brake lever. This, in turn, causes the brakes to be applied as is well-known in the art.

If the sides of the u-shaped handlebars were not turned upwardly at the ends, the rider would encounter an increased air resistance or drag caused by the standard brake lever extending below the end of the handlebar. As the drag or air resistance increases, the power necessary to maintain a desired speed increases. In an attempt to decrease the drag encountered by the rider, the ends of the handlebars are turned upwardly. This decreases the aerodynamic drag by decreasing the aerodynamic cross-sectional area presented by the handlebars and the brake lever. Thus, it is the standard brake levers that make it necessary to turn the ends of the handlebars upwardly.

In the past, some aerodynamic bicycles have minimized the aerodynamic drag caused by the handlebars by simply eliminating the standard hand grip altogether. In this arrangement, the handlebars are replaced by a much narrower elbow rest and grip. While this arrangement does result in a lower aerodynamic drag, it often makes the bicycle more difficult to control. Thus, this option is disadvantageous in a time trial where several turns are encountered and it is necessary to easily control the direction of the bicycle.

The standard brake lever is thus disadvantageous because it increases the aerodynamic drag encountered by the rider. The standard brake lever is additionally disadvantageous because it requires the rider to release his grasp about the handlebars. If the rider is grasping the handlebars when it is necessary to apply the brakes, the rider must first release his grasp about the handlebars and thereafter squeeze or apply a pulling force to the brake lever. Further, when the standard brake lever is used, the brake lever must be moved a significant distance in order to fully apply the brakes. Thus, the standard brake lever is disadvantageous because it requires the rider to engage in unneeded movement of the hands to apply the brakes, and because the brake lever must be moved a significant distance to fully apply the brakes.

Finally, when a rider is climbing a hill in a time trial, it is advantageous to grasp the handlebars at the widest point in order to gain increased leverage when pulling up on the handlebars. The typical cow horn handlebars are often wrapped with a grip in order to make it easier for the rider to grasp the handlebars. The handlebars are, however, often hard to grasp even with the added grip when climbing a hill, due to the small diameter of the handlebars.

Thus, a bicycle brake lever is needed that decreases the amount of aerodynamic drag encountered by the rider of a bicycle. Further, a bicycle brake lever is needed that reduces the effort required to fully apply the brake. Finally, a bicycle brake lever is needed that provides an improved gripping surface for a rider climbing a hill.

SUMMARY OF THE INVENTION

It is therefore an object of the present invention to provide an improved brake lever for use on bicycles that reduces the aerodynamic drag caused by the brake lever.

It is a further object of the invention to provide a brake lever that presents a more aerodynamic cross section than a standard brake lever.

It is yet another object of this invention to provide a brake lever that reduces the effort required to fully apply the brake.

It is still another object of this invention to provide a brake lever that can be operated by a rider without releasing the riders grasp of the handlebars or brake.

It is a still further object of this invention to provide a brake lever with an improved gripping surface that can be grasped and pulled on when a rider is desiring added leverage in climbing a hill.

According to the present invention, the foregoing and other objects are achieved by a brake lever assembly that is coupled with the handlebars of a bicycle. The brake lever has a rear brake body that is coupled to at least one end of the handlebars and a front brake body that is pivotally connected to the rear brake body. The front brake body is moveable between an idle position in which the brake is not applied, and an engaged position in which the brake is fully applied. The front brake body is biased towards the idle position, so that the brake is not applied when no downward force is applied to the front brake body. Further, the front brake body is mechanically coupled to the bicycle brake so that pivoting the front brake body into the engaged position causes the brake to be fully applied. Still further, the front brake body and the rear brake body are coupled in-line with at least one end of the handlebars so that the rear brake body and the front brake body extend outwardly along a central axis of the end of the handlebars.

Additional objects, advantages, and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of the brake lever according to the present invention shown attached to the handlebars of a bicycle;

FIG. 2 is a front elevation view of the brake lever of FIG. 1, showing the front brake body and the shallow grooves therein;

FIG. 3 is a side elevation view of the brake lever of FIG. 1, with the brake lever shown in an idle position;

FIG. 4 is a sectional view of the brake lever of FIG. 1, taken along line 4—4 of FIG.3;

FIG. 5 is a sectional view of the brake lever of FIG. 1, taken along line 5—5 of FIG. 2, with the brake lever shown in an idle position;

FIG. 6 is a side elevation view of the brake lever similar to FIG. 3, with the brake lever shown in an engaged position; and FIG. 7 is an exploded sectional view of the invention shown in FIG. 5, showing individual component parts.

DETAILED DESCRIPTION OF THE PREFERRED EMBODIMENTS

A brake lever assembly embodying the principles of this invention is broadly designated in the drawings by the reference numeral 10. Brake lever 10 is attached to the handlebars 11 of a bicycle (not shown) and includes a front brake body 12 and a rear brake body 14. Front brake body 12 has a truncated conical section 16 and cylindrical section 18. Truncated conical section 16 has an outer surface 20 which has formed therein a number of shallow grooves 22, as best shown in FIG. 2. Shallow grooves 22 provide a gripping surface for a bicycle rider, as is more fully described below. Conical section 16 further has an outer wall 24 and a substantially hollow interior 26, as best shown in FIGS. 5 and 7. Protruding into interior 26 from outer wall 24 is a spring anchor 28, which has an anchor bore 30 disposed therethrough, as best shown in FIG. 7. Spring anchor 28 is preferably integrally formed with outer wall 24.

Conical section 16 transitions to cylindrical section 18. Cylindrical section 18 has an outer surface 32 that cooperates with outer surface 20 to form a continuous outer surface for front brake body 12. Cylindrical section 18 further has a rear wall 34 that has an outer face 35 that abuts rear brake body 14 when front brake body 12 is in an idle position. Rear wall 34 has a generally rectangular connecting insert slot 36 cut in the center thereof which extends vertically from outer surface 32 to a point located an intermediate distance upwardly on outer face 35, as best seen in FIG. 4. Insert slot 36 extends horizontally inward from outer face 35 into interior 26. Thus, interior 26 is accessible via insert slot 36. Insert slot 36 is used to couple front brake body 12 and rear brake body 14. Cylindrical section 18 further has a pivot bore 38 disposed through rear wall 34 which typically extends across section 18 in the manner of a secant. Optionally, pivot bore 38 can extend from one side of cylindrical section 18 only a partial distance, but will typically extend at least from one side of cylindrical section 18 past insert slot 36. Pivot bore 38 is used in cooperation with insert slot 36 to pivotally couple front brake body 12 to rear brake body 14, as is more fully described below.

Rear wall 34 also has a cable bore 40 disposed therethrough that provides cable access to interior 26. Cable bore 40 extends from outer face 35 up to a cable stop countersink 42, as best seen in FIG. 7. Countersink 42 provides an abutting surface for a cable stop 44, which is necessary to apply the brake, as is more fully described below. Thus, cable bore 40 and countersink 42 provide a passage though rear wall 34 into interior 26.

Turning now to rear brake body 14, as best shown in FIG. 7, it can be seen that rear brake body 14 has a front face 46 which has a diameter equal to that of outer face 35. This allows for a smooth transition when front brake body 12 is resting against rear brake body 14. Extending rearwardly from front face 46 is an outer surface 48 that transitions from a cylindrical section 50 to a truncated conical section 52, as shown in FIG. 3. Truncated conical section 52 ends at back wall 54. Extending inwardly from back wall 54 into brake body 14 is a handlebar bore 56. Handlebar bore 56 has a diameter that closely matches the diameter of handlebars 11 and extends only a partial distance into brake body 14 from back wall 54. Extending from outer surface 48 into brake body 14 is a threaded hole 58. Hole 58 extends vertically from outer surface 48 into handlebar bore 56, and is tapped to a common thread size to accommodate a standard setscrew to attach body 14 to the handlebar end.

Extending horizontally into brake body 14 from front face 46 is a cable tunnel 60. Cable tunnel 60 has the same diameter as cable bore 40 and is sized to accommodate a standard brake cable. Cable tunnel 60 extends from front face 46 rearwardly to a cable housing countersink 62. Countersink 62 extends inwardly from back wall 54 into brake body 14 only a partial distance. Thus, countersink 62 and cable tunnel 60 form a passage through brake body 14 from back wall 54 to front face 46.

Protruding from front face 46 is a connecting insert 64 that fits within slot 36 of front brake body 12. Connecting insert 64 is shaped and sized to closely conform to the shape and size of insert slot 36. Extending across connecting insert 64 is a pivot bore 66 that corresponds in diameter with pivot bore 38. When insert 64 is placed fully within insert slot 36, pivot bores 38 and 66 line up to form a continuous bore. Further, when insert 64 is placed fully within insert slot 36, front brake body 12 and rear brake body 14 can be pivotally connected by inserting a pivot rod 68 through pivot bores 38 and 66. Pivot rod 68 thus acts as the pivot point for front brake body 12.

Connecting insert 64 also has disposed therethrough a spring opening 70. Spring opening 70 has a diameter large enough to accommodate one end of an extension spring 72. One end of extension spring 72 is thus passed through spring opening 70 and the other end is passed through anchor bore 30 of spring anchor 28. Extension spring 72 thus holds front brake body 12 in an idle position against rear brake body 14 as is more fully described below.

As stated above, rear brake body 14 is placed and held on a set of bicycle handlebars 11. Specifically, the cylindrical end 74 of handlebars 11 is placed fully within handlebar bore 56, as best seen in FIG. 5. Handlebars 11 are thus inserted into handlebar bore 56 until the handlebars are at the end of handlebar bore 56. Thereafter, a setscrew 76 is inserted through threaded hole 58 to secure rear brake body 14 on handlebars 11.

Front brake body 12 is held on rear brake body 14 by inserting connecting insert 64 fully into slot 36. In this position, pivot bores 38 and 66 are aligned to form a continuous hole. Pivot rod 68 is then inserted into the continuous hole formed by pivot bores 38 and 66. Front brake body 12 is thus prevented from uncoupling from rear brake body 14 by pivot rod 68. Front brake body 12 is, however, allowed to pivot away from brake body 12 about pivot rod 68. Thus, front brake body 12 is pivotally held on rear brake body 14. Further, front brake body 12 and rear brake body 14 are coupled together so that they share a common central axis 77, as best shown in FIG. 5.

Cable stop 44 has connected thereto a brake cable 78 which is surrounded along a portion thereof by an outer housing 80. Cable stop 44 is located within cable stop countersink 42 with brake cable 78 passing through cable bore 40 and cable tunnel 60. Both cable 78 and the end portion of outer housing 80 are disposed within cable housing countersink 62. Brake cable 76 and cable stop 44 are operatively connected to the bicycle brakes (not shown).

In use, one end of extension spring 72 is passed through spring opening 70 and the other end is passed through anchor bore 30 of spring anchor 28. Extension spring 72 is biased so that it exerts a counterclockwise rotational force on front brake body 12 about pivot rod 68. Thus, extension spring 72 holds outer face 35 of front brake body 12 against front face 46 of rear brake body 14 when no other force is being applied to front brake body 12. In this position, central axis 77 forms an obtuse angle α with a central axis 82 of the end of handlebar bore 56. If handlebar bore 56 is centered within rear brake body 14, α will equal 180 degrees.

As can be seen from the above description, brake lever assembly 10 presents an aerodynamic alternative to the standard brake lever. In operation, a bicycle rider will rest his hands on the handlebars 11 near rear brake body 14. In this position, when no other force is being applied to front brake body 12, extension spring 72 maintains front brake body 12 in an idle position against rear brake body 14. In this position, the brakes will be fully disengaged, allowing the wheels of the bicycle to turn freely. When the rider desires to slow or stop the bicycle, the rider will shift his weight forwardly to apply a downward force on front brake body 12. The application of a downward force on front brake body 12 causes front brake body 12 to rotate downwardly in a clockwise rotation about pivot rod 68. The rotation of front brake body 12 about pivot rod 68 causes cable stop 44 to be displaced as cable stop countersink 42 abuts against cable stop 44. As cable stop 44 moves away from its at rest or idle position, it exerts a pulling force on brake cable 76. As brake cable 76 is displaced, the bicycle brakes are applied as is well known in the art. Thus, simply by applying a downward force on front brake body 12, the bicycle brakes are applied. As can be seen, the rider need not release his grip on the bicycle to accomplish application of the brake. When the rider no longer desires the brakes to be applied, the rider need only shift his weight rearwardly so that a downward force is no longer applied on front brake body 12. Extension spring 72 will thereafter operate to return front brake body 12 to an idle position with outer face 35 resting against front face 46. Brake assembly 10 is therefore capable of providing an effective and efficient brake lever for a bicycle. Further, because its construction allows it to extend in a co-linear fashion along the axis of handlebars 11 it causes less aerodynamic drag than previously used brake levers. This decrease in drag can translate into faster times for the rider of the bike.

In further operation, a bike rider will often encounter a grade or hill in a race. In such a situation, it is often advantageous to obtain the widest possible grip on handlebars 11. Brake assembly 10 is located in this widest position on handlebars 11. Thus, front brake body 12 has shallow grooves 22 thereon. Grooves 22 make it easier for the rider to obtain a comfortable and sure grip. As the rider is climbing the grade, he will exert a pulling force on front brake body 12. Front brake body 12, in its idle position, is abutting against rear brake body 14. Thus, the brakes will not be applied and front brake body 12 presents a solid grip upon which to exert a pulling force.

From the foregoing, it will be seen that this invention is one well adapted to obtain all of the ends and objects hereinabove set forth together with other advantages which are obvious and which are inherent to the structure. It will be understood and certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A brake lever assembly for a bicycle having brakes and handlebars with forward facing terminal ends, each end having a central axis, said assembly comprising:

a stationary rear brake body of the brake assembly coupled to at least one terminal end of the handlebars, said body extending forwardly and outwardly from the terminal end;

a front brake body of the brake assembly pivotally coupled to said rear brake body, said front brake body having a truncated conical shape to create an aerodynamic form and being movable between an idle position wherein said front brake body is abutted against said rear brake body so that the brake is not applied said front brake body extending forwardly outwardly from said rear brake body, and an engaged position where said front brake body is pivoted away from said rear brake body so that the brake is fully applied;

means for biasing said front brake body toward said idle position; and means for mechanically coupling said front brake body to the brake so that pivoting said front brake body into said engaged position fully applies the brake;

wherein said front brake body and said rear brake body are coupled in-line with the associated terminal end so that said front brake body and said rear brake body extend forwardly outwardly from the terminal end along the central axis of the terminal end in said idle position.

2. The brake lever assembly of claim 1, wherein said biasing means is a tension spring coupled to said front brake body and said rear brake body.

3. The brake lever assembly of claim 1 in combination with the bicycle.

4. The brake lever assembly of claim 1 wherein said front brake body has an outer surface with shallow grooves cut therein to aid a bike rider in gripping said front brake body.

5. The brake lever assembly of claim 1, wherein said front brake body pivots about a pivot rod inserted through an opening in said front brake body and through an opening in said rear brake body.

6. The brake lever assembly of claim 5, wherein said pivot rod and said openings are located adjacent a rear, lower portion of said front brake body.

7. The brake lever assembly of claim 6, wherein front brake body pivots downwardly to said engaged position.

8. The brake lever assembly of claim 1, wherein said mechanical coupling means includes a brake cable that has an enlarged end, said brake cable runs from the brake through said rear brake body into said front brake body, said rear brake body having a passageway that surrounds said cable, said front brake body having a passageway for said cable that terminates in a hollow interior of said front brake body, said interior having an abutting surface for said enlarged end.

9. The brake lever assembly of claim 1, wherein said front brake body has a rear wall that is located ninety degrees relative to said central axis, said rear wall abutting said rear brake body when said front brake body is in an idle position, said rear wall being prevented from an upward rotation by said abutment.

10. A brake lever assembly for a bicycle having at least one handle bar presenting a forward-facing terminal end, the brake lever assembly comprising:

a rear brake body supported on the terminal end of the handle bar and including a tubular side wall presenting a longitudinally extending bore sized for receipt of the terminal end of the handle bar, and a front end face protruding radially inward from the tubular side wall, said rear brake body protruding forwardly outwardly from said terminal end, a front brake body supported on the rear brake body for pivoting movement between an idle position and a brake-engaging position, the front brake body including an outer side wall and a rear end wall protruding inward from the outer side wall, the rear end wall abutting the front end face of the rear brake body in the idle position of the front brake body to prevent upward pivoting movement of the front brake body beyond the idle position, said front brake body protruding forwardly outwardly from said rear brake body; and a spring connected between the front and rear bodies for biasing the front body toward the idle position.

11. The brake lever assembly of claim 10 in combination with the bicycle.

* * * * *